(12) United States Patent
Volkovs et al.

(10) Patent No.: US 7,853,796 B2
(45) Date of Patent: Dec. 14, 2010

(54) METHOD, SYSTEM AND COMPUTER PROGRAM FOR POLYNOMIAL BASED HASHING AND MESSAGE AUTHENTICATION CODING WITH SEPARATE GENERATION OF SPECTRUMS

(76) Inventors: Nikolajs Volkovs, 22 Elkhorn Drive, Apartment 416, Toronto, ON (CA) M2K 1J4; Vijaya Kumar Murty, 38 Elm Street, Apartment 1411, Toronto, ON (CA) M5G 2K5

( * ) Notice: Subject to any disclaimer, the term of this patent is extended or adjusted under 35 U.S.C. 154(b) by 861 days.

(21) Appl. No.: 11/797,979

(22) Filed: May 9, 2007

(65) Prior Publication Data
US 2007/0291934 A1    Dec. 20, 2007

(30) Foreign Application Priority Data
May 9, 2006    (CA)    .................................... 2546148

(51) Int. Cl.
*H04L 29/06* (2006.01)
*H04L 9/32* (2006.01)
(52) U.S. Cl. ........................ 713/181; 713/161; 713/170
(58) Field of Classification Search ................. 713/161, 713/170, 181; 380/28
See application file for complete search history.

(56) References Cited

U.S. PATENT DOCUMENTS
2006/0050870 A1*    3/2006    Kimmel et al. ............... 380/30

* cited by examiner

*Primary Examiner*—Nasser Moazzami
*Assistant Examiner*—Mohammad W Reza

(57) ABSTRACT

Computer software or integrated circuit for performing a secure hashing method including one or more of the following: representing an initial sequence of bits as a specially constructed set of polynomials; transformation of this set by masking; partitioning the transformed set of polynomials into a plurality of classes; forming the bit string during the (separated) partitioning; for each of the plurality of classes, factoring each of the polynomials and so as to define a set of irreducible polynomials and collecting these factors in registers defined for each of the plurality of classes; wrapping the values of the registers from the plurality of classes by means of an enumeration; organizing the enumerations and the bit strings into a knapsack; and performing an exponentiation in a group to obtain the hash value or the MAC value.

2 Claims, 3 Drawing Sheets

METHOD, SYSTEM AND COMPUTER PROGRAM FOR POLYNOMIAL BASED HASHING AND MESSAGE AUTHENTICATION CODING WITH SEPARATE GENERATION OF SPECTRUMS

FIELD OF INVENTION

The present invention relates generally to data communication and storage. More specifically, the present invention relates to systems and methods for improving the security associated with data integrity and authentication.

BACKGROUND OF INVENTION

A hash function is best understood as a map that sends binary strings of arbitrary length to binary strings of length $\tau$ (or hash length).

$$H: \{0,1\}^* \to \{0,1\}^\tau$$

This $\tau$ value is fixed in advance. Commonly used hash functions have a $\tau$ value that varies from 32 to 512 (A. J. Menezes, P. C. van Oorschot, S. A. Vanstone, Handbook of Applied Cryptography, CRC Press, 1997).

A Message Authentication Code (or MAC) is a hash function that incorporates a key, namely:

$$H: \{0,1\}^* \times K \to \{0,1\}^\tau$$

where K is a key space. When a user sends data, the hash value, or MAC value of the data is also calculated and appended to the message. The recipient can then verify the integrity of the data by recomputing the hash value or MAC value and comparing it with the one that was appended to the message, thereby enabling the recipient, for example, to authenticate the message.

One of the challenges in providing hash-based data integrity solutions is that the hash value needs to be efficiently computable, and collisions should be improbable. Specifically, given a binary string M, it should be computationally infeasible to find another string M', satisfying the following equation:

$$H(M)=H(M')$$

Hash and MAC algorithms are extremely important and at the same time the most vulnerable systems of network security (A. J. Menezes, P. C. van Oorschot, S. A. Vanstone, Handbook of Applied Cryptography, CRC Press, 1997). If a hash or MAC value can be determined by an external agency, a "collision" has occurred. If hash or MAC values are subject to collisions, the recipient of data can never be certain that the data in question has not been tampered with or corrupted. Its collision resistance measures the value of a hash (MAC) algorithm. Since the algorithm produces a string of fixed length from a message of any length, it is clear that there will be collisions. However, a good hash algorithm is one for which it is computationally infeasible to create a collision.

In a recent dramatic development, all the main hash algorithms MD-5, RIPEMD, and the MAC algorithm SHA-1 were compromised. Collisions were created for MD-5 and RIPEMD, and a group of Chinese mathematicians managed to reduce the number of operations needed to realise the brute-force attack on SHA-1 to a danger level. It should be noted that SHA-1 is the hash algorithm currently recommended by the US government. Keeping in mind that a lot of different security applications (Kerberos, MIME, IpSec, Digital Signatures and so forth) are using hash algorithms (mainly SHA-1), there is an urgent need to construct new hash algorithms.

All the main hash functions and secure functions, including those mentioned above, are referred to as iterated hash functions. They are based on an idea proposed by Damgard-Merkle (R. C. Merkle, Secrecy, Authentication, and Public Key Systems, UMI Research Press, Ann Arbor, Mich., 1979). According to this idea, the hash function takes an input string of bits, and partitions it into fixed-sized blocks of a certain size q. Then a compression function takes q bits of i-th partition and m bits from the previous calculation and calculates m bits of i+1 iteration. The output value of the last iteration (of size m) is the hash value.

Since it now appears to be easier to create a collision in existing main hash functions and secure functions, the development of new hashing algorithms that would not be based on the Damgard-Merkle approach, is extremely desirable.

Various authors have considered hash algorithms when a message to be hashed is presented as a class of various algebraic objects—elements of fields, groups, etc. Hashing based on polynomial representation is known. One of the most famous approaches is to present data as a collection of polynomials over the field of a certain characteristic. Carter and Wegman (Universal classes of hash functions. J. of Computer and System Sciences 18, 1979, 143-154) proposed the method of presenting a message as coefficients of a polynomial, and a certain point of evaluation of the polynomial is used as a key.

Krovetz and Rogaway (Fast universal hashing with small keys and no preprocessing: the PolyR construction, in: Information Security and Cryptology ICICS 2000, pp. 73-89, ed. D. H. Won, Lecture Notes in Computer Science, 2015, Springer-Verlag, 2000) considered a message as a collection of elements $(m_0, m_1, \ldots, m_n)$ of a certain field F. A hash value of the message is a point $y \in F$, which is computed by calculation in the field F of the value $m_0 k^n + m_1 k^{n-1} + \ldots + m_n k^0$ for some key $k \in F$.

However, these approaches do not represent the data in terms of polynomials, nor do they compute the hash value using the factorization of these polynomials.

There is a need therefore for methods, computer programs and computer systems that while utilizing hash or MAC algorithms (in particular algorithms of the SHA family) are operable to provide an improved level of security over existing methods, computer programs and computer systems that implement SHA type hash and MAC algorithms. There is a further need for the methods, computer programs and computer systems that meet the aforesaid criteria and are further easy to implement with existing technologies, and are computationally feasible.

SUMMARY OF INVENTION

In one aspect of the present invention, a secure hashing method is provided consisting of: (1) representing an initial sequence of bits as a specially constructed set of polynomials as described herein, (2) transformation of this set by masking, (3) partitioning the transformed set of polynomials into a plurality of classes, (4) forming the bit strings during the partitioning, (5) for each of the plurality of classes, factoring each of the polynomials and, so as to define a set of irreducible polynomials, collecting these factors in registers defined for each of the plurality of classes, (6) wrapping the values of the registers from the plurality of classes by means of an enumeration, (7) organizing the enumerations and the bit strings into a knapsack, and, finally, (8) performing an exponentiation in a group to obtain the hash value or the MAC value.

Step (8) above may consist of the calculation of $\alpha^V$ in the field $F_{2^\tau}$, where $\alpha$ is a generator of the multiplicative group $F_{2^\tau}^\times$. Alternatively, one may consider $V\gamma$, where E is an elliptic curve over $F_{2^\tau}$ and $\gamma$ is a generator of the group $E(F_{2^\tau})$. In fact, both of these methods are special cases of a more general scheme in which we consider any abstract cyclic group G with a generator g. We assume that the numeration of the elements of G requires a binary string of the size $\tau$ and that the discrete logarithm problem in G is difficult.

Because of the polynomial representation described above, in order to create a collision in accordance with the secure hash function described above, an attacker would be required to solve a collection of systems of non-linear iterated exponential equations over a finite field having specific constraints. In the case of a MAC, this difficulty is combined with the difficulty of opening the knapsack, and the difficulty of (a) solving the elliptic curve discrete logarithm referred to below, or (b) the discrete logarithm problem in the finite field, and this further contributes to the security of the method of the present invention.

As a result of the structure of the procedure, the resulting hash or MAC value has the following important attributes:
a) the length of the output can be changed simply by changing the final step;
b) the computation is a bit-stream procedure as opposed to a block procedure;
c) creating a collision requires the solution to several difficult mathematical problems; and
d) varying some parameters (the number of the bit strings, or the length of the bit strings, for example) allows easy variation of the difficulty of creating a collision.

BRIEF DESCRIPTION OF DRAWINGS

A detailed description of the preferred embodiment(s) is(are) provided herein below by way of example only and with reference to the following drawings, in which.

Figure 1:
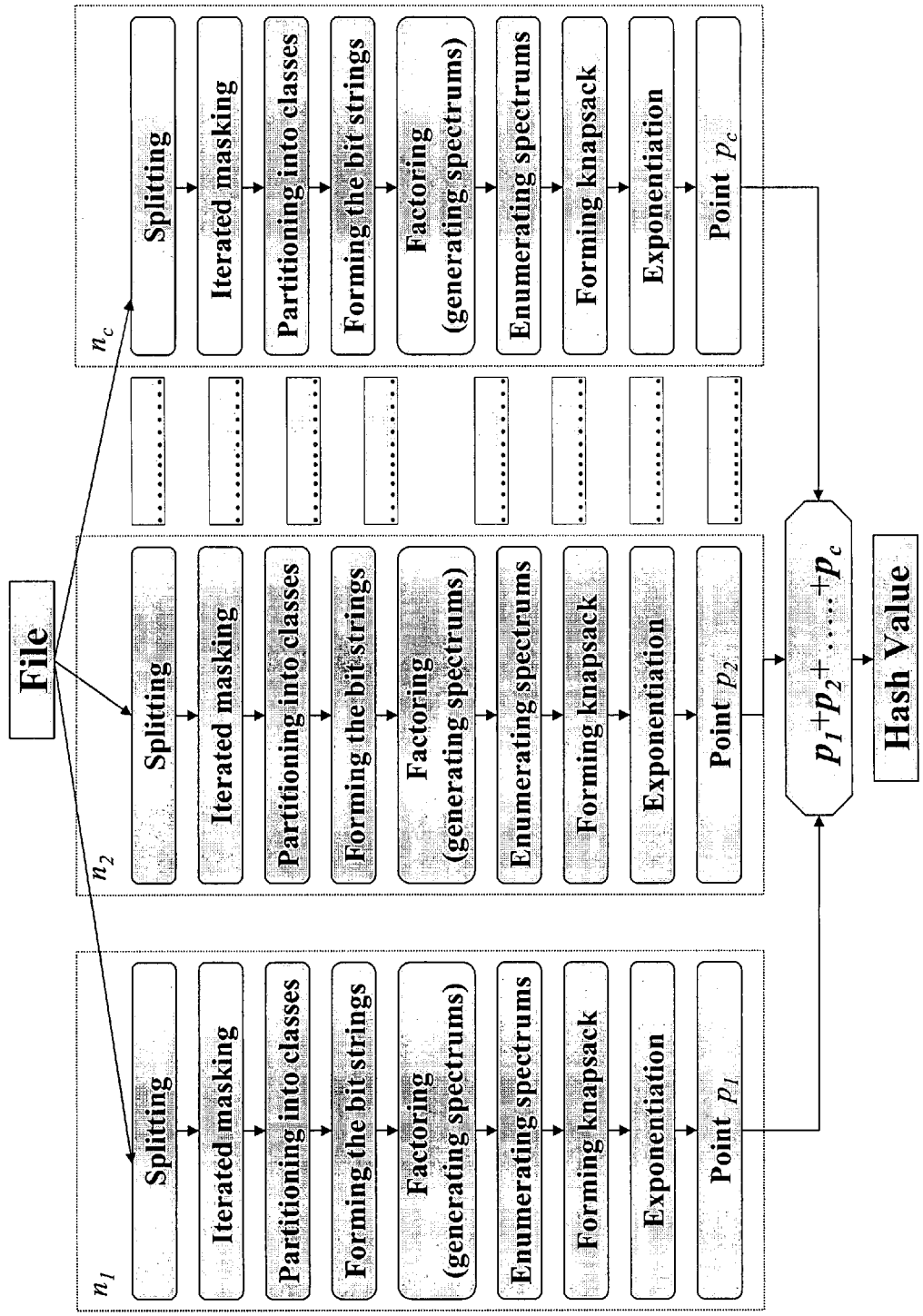
FIG. 1 "Scheme of hashing with separate generation of spectrums" is a flowchart diagram illustrating the steps involved in the present invention in connection with secure hashing.
Figure 2:
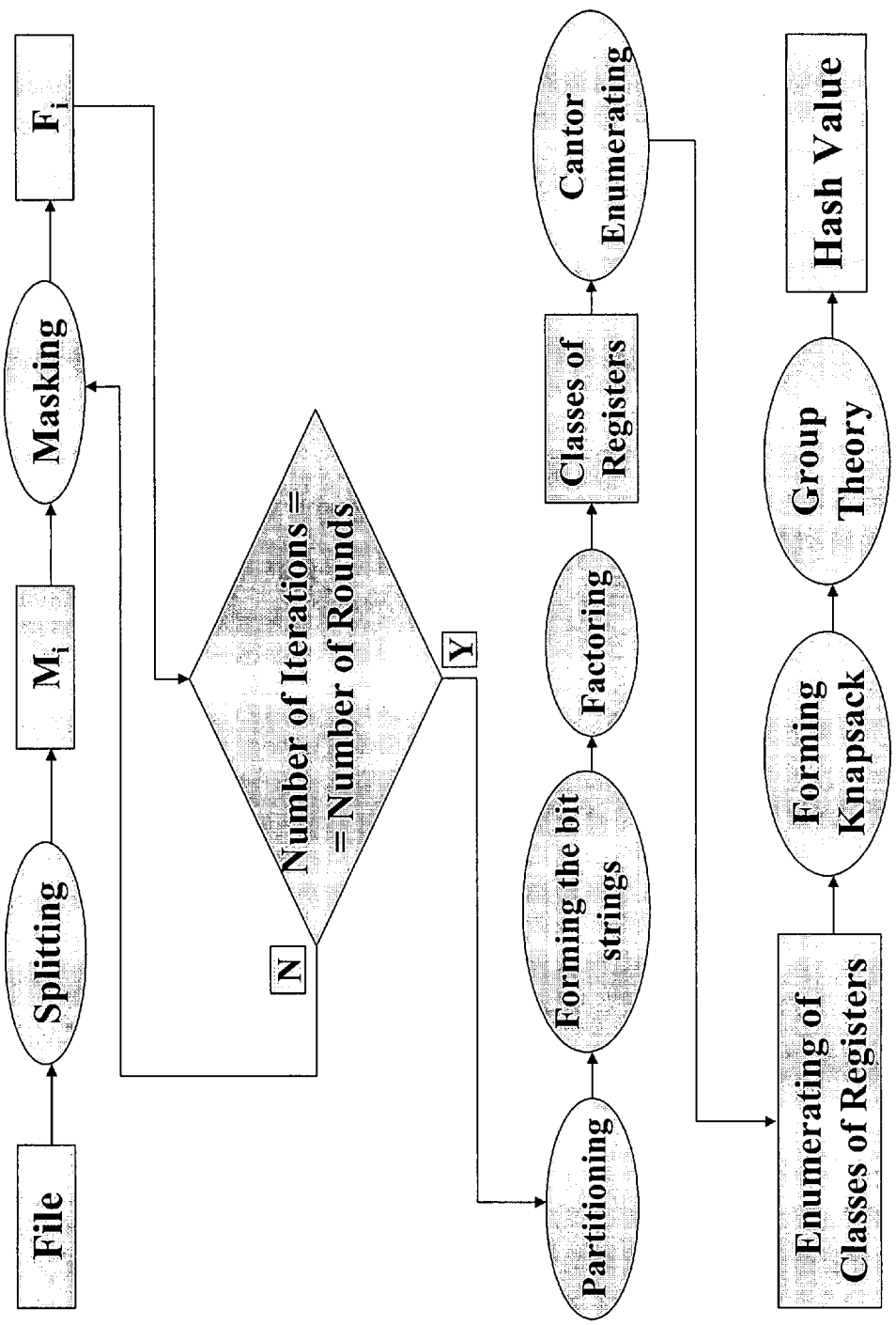
FIG. 2 "Hashing with iterations" is a flowchart diagram illustrating the steps involved in the present invention with consideration of rounds (iterations) in the process of the calculation of a hash value.
Figure 3:
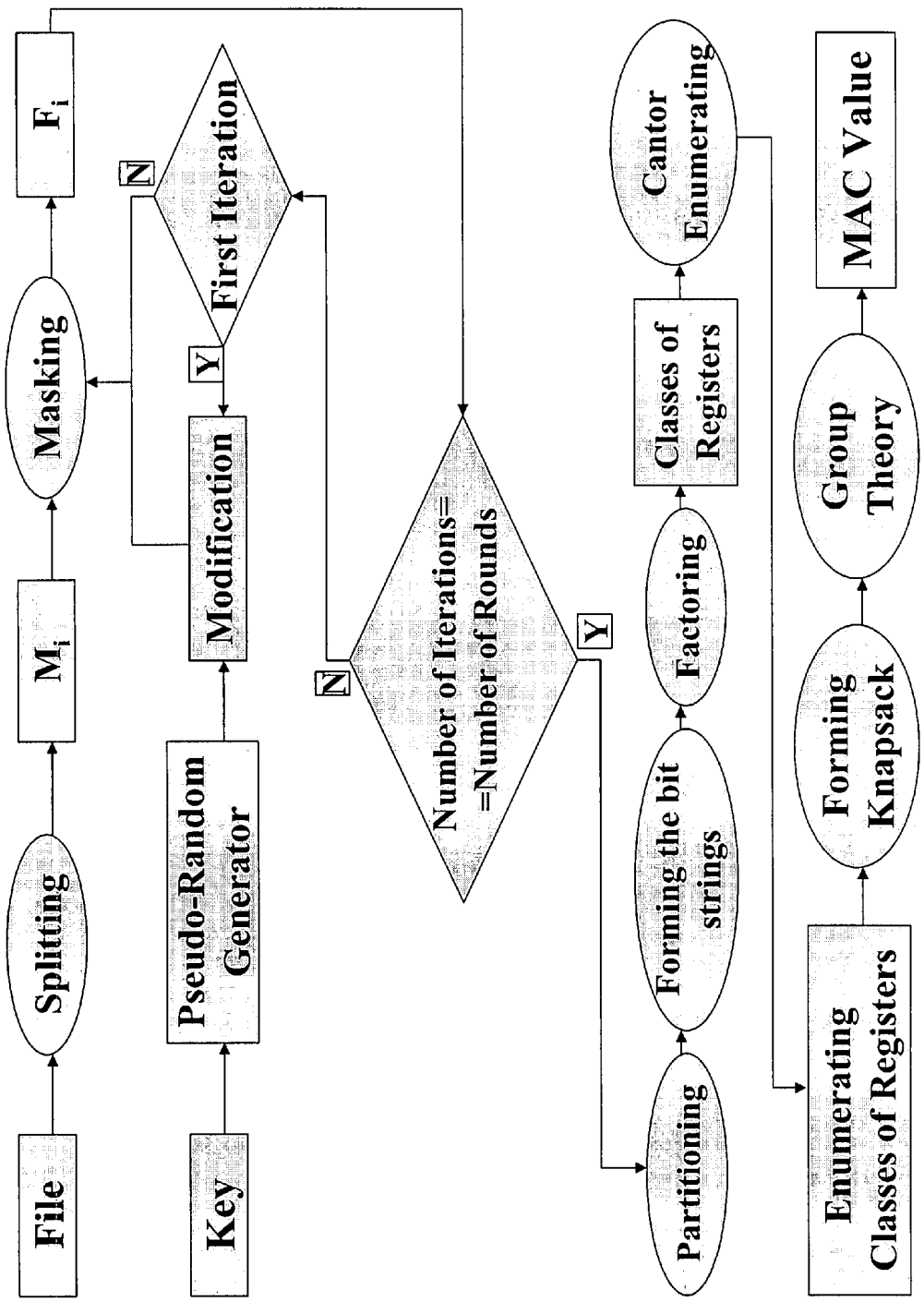
FIG. 3 "Message authentication coding with iterations" is a flowchart diagram illustrating the steps involved in the present invention with consideration of rounds (iterations) in the process of the calculation of a MAC value.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

The secure hashing method more particularly consists of: (1) representing an initial sequence of bits as a specially constructed set of polynomials as described herein, (2) transformation of this set by masking, (3) partitioning the transformed set of polynomials into a plurality of classes, (4) forming the bit string during the partitioning, (5) for each of the plurality of classes, factoring each of the polynomials and, so as to define a set of irreducible polynomials, collecting these factors in registers defined for each of the plurality of classes, (6) wrapping the values of the registers from the plurality of classes by means of an enumeration, (7) organizing the enumerations and the bit strings into a knapsack, and finally, (8) performing an exponentiation in a group to obtain the hash value or the MAC value.

A number of notations used in this disclosure should be understood. $M \in \{0,1\}^*$ shall represent a sequence of bits, where $\{0,1\}^*$ is the set of all possible finite strings. $|M|$ shall represent the length of M in bits. By $M[k]M[l]$ we denote the concatenation of two bits from M, namely the k-th and l-th bits. We will write $M(i,j)$ for the sequence of bits $M[i]M[i+1] \ldots M[j]$, if $i \leq j$, $j \leq |M|$ or $M[j]M[j-1] \ldots M[i]$ if $j \leq i$, $i \leq |M|$. By $M(k,i)M(l,j)$ we denote the concatenation of two strings $M(k,i)$ and $M(l,j)$. If M and $M_1$ are two strings such that $|M|=|M_1|$ then $M \oplus M_1$ is their bitwise xor. For a sequence of bits $M(i,j)$ denote by $\overline{M(i,j)}$ the complement string. Where there is no danger of confusion, we will denote $M(i,j)$ by $M_i$.

The method of the present invention uses polynomials of some fixed degree, say n. To make this computationally efficient, we choose an n satisfying $4 \leq n \leq 10$. In this range, we can store a lookup table to make factorization of polynomials very fast. We could choose a larger value of n if we wished, provided we had more memory and computational power.

Irreducible polynomials of degree m are obtained as follows. For $m \geq 1$, the number of irreducible polynomials of degree m over $F_2$ is given by the well-known formula $$\frac{1}{m} \sum_{d|m} \mu(m/d) 2^d$$

where $\mu$ is the Möbius function. For m=0, we have 2 "polynomials", namely the two elements of the field. In particular, we have the following table of values for small values of m:

| degree | Number of irreducible polynomials |
| --- | --- |
| 0 | 2 |
| 1 | 2 |
| 2 | 1 |
| 3 | 2 |
| 4 | 3 |

Denote by J(n) the lexicographically ordered set of all irreducible polynomials of degree less than n with coefficients in $F_2$, the finite field of two elements. Denote by irr(n) the cardinality of J(n). Thus, irr(4)=7 and J(4) is the following ordered list:

| Number | Polynomial |
| --- | --- |
| 1 | 0 |
| 2 | 1 |
| 3 | x |
| 4 | x + 1 |
| 5 | $x^2 + x + 1$ |
| 6 | $x^3 + x + 1$ |
| 7 | $x^3 + x^2 + 1$ |

For $h \in F_{2^n}$, $FC_n(h, i)$ indicates the multiplicity of the i-th irreducible polynomial from J(n) in the factorization of h. For example, for n=4, noting that the third element in J(4) is the polynominal x and the fourth element is x+1, we have $$FC_4(x^2+x, 1)=0, FC_4(x^2+x, 4)=1, FC_4(x^3+x^2, 3)=2.$$

It is evident that $FC_n(h, 1)=1$ if and only if h=0 and $FC_n(h, 2)=1$ if and only if h=1. Later, when it is clear from the context, we will omit n and simply write J and FC(h, i).

It should be understood that for any polynomial h over $F_2$ of degree less than n denote by int(h) an integer number represented by h as a binary number. For instance, $int(x^3+x^2+x)=14$ and $int(x^3+1)=9$. In general, if $$h=a_0x^{n-1}+a_1x^{n-2}+\ldots+a_{n-1}$$

is a polynomial with coefficients $a_0, \ldots, a_{n-1}$, from $F_2$, then let us define the integer $\tilde{a}$ by $$\tilde{a}_i = \begin{cases} 0 & \text{if } a_i = 0 \text{ in } F_2 \\ 1 & \text{If } a_i = 1 \text{ in } F_2. \end{cases}$$

Then, $$int(h) = \tilde{a}_0 2^{n-1} + \tilde{a}_1 2^{n-2} + \ldots + \tilde{a}_{n-1} 2^0.$$

Padding

It should be understood that a sequence of bits always has to be padded. Let M be any sequence of bits. We pad M by putting in the end of M the sequence of bits 1010 . . . 10 of a size 4096 bits.

Splitting

Splitting is best understood as a stage in accordance with the present invention whereby the initial string of bits is decomposed into smaller, overlaid bit segments or "classes". This decomposition can be achieved in two ways: direct splitting and backward splitting.

A. Direct Splitting

Let M be any preliminary padded sequence of bits. Denote k=|M| and choose some $n_1, n_2, \ldots n_c$, where $4 \leq n_i \leq 10$. We split M into the set of the following sequences:

$$M(1, n_1), M(2, n_1+1), \ldots, M(k-n_1+1, k), \quad (1)$$

$$M(k-n_1+2, k)M[1], M(k-n_1+3, k)M(1, 2), \ldots, M[k]M(1, n_1-1).$$

$$M(1, n_2), M(2, n_2+1), \ldots, M(k-n_2+1, k),$$

$$M(k-n_2+2, k)M[1], M(k-n_2+3, k)M(1, 2), \ldots, M[k]M(1, n_2-1).$$

$$\ldots$$

$$M(I, n_c), M(2, n_c+1), \ldots, M(k-n_c+1, k),$$

$$M(k-n_c+2, k)M[1], M(k-n_c+3, k)M(1, 2), \ldots, M[k]M(1, n_c-1).$$

Note that any sequence $M(i, i+n_j-1)$ can be considered as a polynomial of degree less than $n_j$ over $F_2$, that is, if for some $i \leq k-n_j+1$ sequence $M(i, i+n_j-1)$ is $a_0, a_1, \ldots, a_{n_j-1}$, then the corresponding polynomial is $$a_0x^{n_j-1}+a_1x^{n_j-2}+\ldots+a_{n_j-1}$$

B. Backward Splitting

Let again M be any sequence of bits. When we apply the backward splitting we pad M from the beginning, that is, we add 4096 corresponding bits before M[l]. Now, based on chosen some $m_1, m_2, \ldots, m_c$, where $4 \leq m_i \leq 10$, we split preliminary padded M into the following collections of sequences:

$$M(k, k-m_1+1), M(k-1, k-m_1), \ldots, M(m_1, 1), M(m_1-1, 1)M[k], \quad (2)$$

$$M(m_1-2, 1)M[k]M[k-], \ldots, M[1]M(k, k-m_1+1),$$

$$M(k, k-m_2+1), M(k-1, k-m_2), \ldots, M(m_2, 1), M(m_2-1, 1)M[k],$$

$$M(m_2-2, 1)M[k]M[k-1], \ldots, M[1]M(k, k-m_2+1),$$

$$\ldots$$

$$M(k, k-m_c+1), M(k-1, k-m_c), \ldots, M(m_c, 1), M(m_c-1, 1)M[k],$$

$$M(m_c-2, 1)M[k]M[k-1], \ldots, M[1]M(k, k-m_c+1).$$

And again, any element $M(i, i-m_j)$ can be considered as a polynomial over $F_2$.

Denote by $S(M, n_1), S(M, n_2), \ldots, S(M, n_C)$ the given ordered sets (1) and note that any $S(M, n_j)$ contains k polynomials. Remark also that the just described procedure of forming the sequences $S(M, n_j), j=1, \ldots c$ is a stream procedure. Of course, in practise, there is no need to consider all sets $S(M, n_j)$ for $j=1, \ldots, c$, as the time of the calculation of a hash (or MAC) value in that case will be increased, which will be discussed below.

EXAMPLE I

As an example, consider the following sequence of bits M without padding:

011010

Let $n_1=4$ and $n_2=6$. Let the procedure of forming sequences be $S(M, 4)$ and $S(M, 6)$. So, the elements of $S(M, 4)$ are $$x^2+x, x^3+x^2+1, x^3+x, x^2, x^3+1, x+1$$

while $S(M, 6)$ contains elements $$x^4+x^3+x, x^5+x^4+x^2, x^5+x^3+1, x^4+x+1, x^5+x^2+x, x^3+x^2+1.$$

Now, we want to express relations between the elements of $S(M, n_j)$ for different j for the case of the forward splitting.

Consider some $n_j, j=1, \ldots, c$ and the corresponding sequence of polynomials $S(M, n_j)$ for the case of the forward splitting. It is clear that the same correspondences (with minor changes) can be built for the backward splitting too. It is not hard to see that for any $i=1, \ldots, k$ we get $$M_{i+1}=AM_i^T \oplus BM_{i+2}^T, \quad (3)$$

where $$A = \begin{pmatrix} 0 & 1 & 0 & \ldots & 0 & 0 \\ 0 & 0 & 1 & \ldots & 0 & 0 \\ 0 & 0 & 0 & \ldots & 0 & 0 \\ & & \ldots & & & \\ 0 & 0 & 0 & \ldots & 0 & 1 \\ 0 & 0 & 0 & \ldots & 0 & 0 \end{pmatrix},$$

and

-continued $$B = \begin{pmatrix} 0 & 0 & 0 & \ldots & 0 & 0 \\ 0 & 0 & 0 & \ldots & 0 & 0 \\ 0 & 0 & 0 & \ldots & 0 & 0 \\ & & \ldots & & & \\ 0 & 0 & 0 & \ldots & 0 & 0 \\ 0 & 0 & 0 & \ldots & 1 & 0 \end{pmatrix},$$

are $n_j \times n_j$ matrices, $M_i^T$ and $M_{i+2}^T$ are transposed vectors.

Consider two sequences $S(M,n_{j_1})$, and $S(M,n_{j_2})$, where $n_{j_1} < n_{j_2}$. Denote elements from $S(M,n_{j_1})$ and $S(M,n_{j_2})$ by $M_i^{n_{j_1}}$ and $M_i^{n_{j_2}}$, correspondingly. Then the following hold:

$$M_i^{n,j_1} = D_1(M_i^{n,j_2})^T, \quad (4)$$

$$M_{i+1}^{n,j_1} = D_2(M_i^{n,j_2})^T,$$

$$\ldots,$$

$$M_{i+q}^{n,j_1} = D_q(M_i^{n,j_2})^T,$$

where, $q = n_{j_2} - n_{j_1}$, and $$D_1 = \begin{pmatrix} 1 & 0 & 0 & \ldots & & 0 & 0 \\ 0 & 1 & 0 & \ldots & & 0 & 0 \\ 0 & 0 & 1 & \ldots & & 0 & 0 \\ & & \ldots & & & & \\ 0 & 0 & 0 & \ldots & & 0 & 0 \\ 0 & 0 & 0 & \ldots 1 \ldots & & 0 & 0 \end{pmatrix},$$

$$D_2 = \begin{pmatrix} 0 & 1 & 0 & \ldots & & 0 & 0 \\ 0 & 0 & 1 & \ldots & & 0 & 0 \\ 0 & 0 & 0 & \ldots & & 0 & 0 \\ & & \ldots & & & & \\ 0 & 0 & 0 & \ldots & & 0 & 0 \\ 0 & 0 & 0 & \ldots 01 \ldots & & 0 & 0 \end{pmatrix},$$

$$\ldots,$$

$$D_q = \begin{pmatrix} 0 & 0 & 0 & \ldots 1 \ldots & & 0 & 0 \\ 0 & 0 & 0 & \ldots & & 0 & 0 \\ 0 & 0 & 0 & \ldots & & 0 & 0 \\ & & \ldots & & & & \\ 0 & 0 & 0 & \ldots & & 1 & 0 \\ 0 & 0 & 0 & \ldots & & 0 & 1 \end{pmatrix},$$

are $n_{j_1} \times n_{j_2}$ matrices and $(M_i^{n_{j_2}})^T$ is a transposed vector $M_i^{n_{j_2}}$.

Denote by N the set $\{1, 2, \ldots, c\}$. Denote by $N_1$ the subset of N, for which we generate forward splitting (1), that is we form $S(m,n_i)$ for $i \in N_1$. Denote by $N_2$ the subset of N indices, for which we generate the backward splitting (2). $N_1$ and $N_2$ may contain common elements, moreover, $N_1$ and $N_2$ can be even equal.

Again, we generate the sequences (1) for some jail the elements from $N_2$. In contrary splitting, we need to have at least one sequence in form (1'). Note that the division of the set $\{n_1, n_2, \ldots, n_c\}$ into subsets $N_1$ and $N_2$ can be done arbitrarily.

Multiple Masking

The elements of the sets $$S(M, n_1), S(M, n_2), \ldots, S(M, n_c) \quad (5)$$

will be further transformed in accordance with a multiple masking procedure. Remark that some of the sequences $S(M, n_i)$, $i=1, \ldots, c$ are constructed in accordance with the backward splitting.

Masking is a transformation of the elements of a sequence $S(M, n)$. In fact, masking is a non-linear function that generates polynomials new polynomials, having the polynomials from $S(M, n)$ as its input. It is clear that for any $4 \leq n \leq 10$ the ordered collection of polynomials $S(M,n)$ represents a sequence M in a unique way. We further transform $S(M,n)$ in order to obtain a new collection of polynomials. The transformation is fast, non-linear and represents a sequence $S(M, n)$ in a unique way. In general any non-linear function can be used for masking if the calculation of values of the function is fast, non-linear and represents the initial sequence of polynomials in a unique way. We have chosen a function that is quite fast and that forces one to solve a system of exponential iterated equations for obtaining the polynomials $S(M, n)$ from the transformed collection of polynomials. Below, we describe the construction of the transformation.

Based on the sequence of sets $S(M, n_1), S(M, n_2), \ldots, S(M, n_c)$ we prepare c registers CUR, so that, for any sequence $S(M, n_j)$, we associate a register $CUR^{n_j}$. We need to show how to calculate the values of the registers and we describe the procedure for a fixed n, so we write simply CUR.

We describe the calculation of the values of CUR iteratively. Let $\delta$ and $\beta$ be generators of $GF(2^n)$. We set $$CUR_1 = M_1 \oplus \delta \oplus \beta, \quad (6)$$

$$CUR_2 = M_2 \oplus \delta^{int(M_1)} \oplus \beta^{int(CUR)_1},$$

$$CUR_3 = M_3 \oplus \delta^{(int(M_2)+int(M_1)) \bmod 2^n} \oplus \beta^{(int(CUR_2)+int(CUR_1)) \bmod 2^n},$$

$$\ldots$$

$$CUR_i = M_i \oplus \delta^{(int(M_{i-1})+int(M_{i-2})) \bmod 2^n} \oplus \beta^{(int(CUR_{i-1})+int(CUR_{i-2})) \bmod 2^n}$$

for $i=1, \ldots, 2^n+1$.

For $i=2^n+2, \ldots, k$ we calculate $CUR_i$ in accordance with $$CUR_i = M_i \oplus \delta^{(int(M_{i-1})+int(CUR_{d1})) \bmod 2^n} \oplus \beta^{(int(CUR_{i-1})+int(CUR_{d2})) \bmod 2^n},$$

where $$d_i = i - 2 - int(M_{i-1}), \quad d_2 = i - 2 - int(CUR_{i-1}).$$

We stress that the procedure just described for calculating the values $CUR_i$ is, in fact, a stream procedure.

We note that for the manipulations above, we are viewing $F_{2^n}$ as a field and also as a vector space over $F_2$. Let $f(x)$ be a polynomial so that there is an isomorphism of fields.

Denote by $\phi_f$ the isomorphism of vector spaces $$F_2[x]/(f(x)) \to F_2^n.$$

Let $\delta$ and $\beta$ be generators of $F_{2^n}^\times$ corresponding to polynomials $f(x)$ and $g(x)$. We set $$CUR_i = M_i \oplus \phi_f(\delta) \oplus \phi_g(\beta),$$

$$CUR_i = M_i \oplus \phi_f(\delta^{(int(M_{i-1})+int(M_{i-2})) \bmod 2^n}) \oplus \phi_g(\beta^{(int(CUR_{i-1})+int(CUR_{i-2})) \bmod 2^n})$$

for $i=1, \ldots, 2^n+1$. For $i=2^n+2, \ldots, k$ we calculate $CUR_i$ by $$CUR_i = M_i \oplus \phi_f(\delta^{(int(M_{i-1})+int(CUR_{d1})) \bmod 2^n}) \oplus \phi_g(\beta^{(int(CUR_{i-1})+int(CUR_{d2})) \bmod 2^n})$$

where $$d_i = i-2-\text{int}(M_{i-1}), \; d_2 = i-2-\text{int}(CUR_{i-1}).$$

As it was mentioned above, we calculate the values of registers $CUR^{n_j}$ for all the elements of the sequences $S(M,n_1)$, $S(M,n_2), \ldots, S(M,n_c)$. Of course, for different $n_j$ we use different fields $F_{2^{n_j}}$ with the corresponding generators. Thus, we have prepared c sets of collections of polynomials $$CUR_i^{n_1}, CUR_i^{n_2}, \ldots, CUR_i^{n_c}, \qquad (7)$$

where $i=1, \ldots, k$. It is clear that the combination of splitting and masking is a stream procedure.

The following theorem shows that $CUR^n$ is a collection of polynomials that in a unique way represents $S(M,n)$ and therefore M. We present it here without a proof.

Theorem. Let M and M' be any two sequences of k bits. Let, further, $S(M, n)$, $S(M', n)$, $CUR^n$ and $CUR^{n'}$ be the corresponding sequences of polynomials. Then for any n $$CUR_1 = CUR'_1, \ldots, CUR_k = CUR'_k$$

if and only if $$M_1 = M'_1, \ldots, M_k = M'_k.$$

Iterated Masking

The iterated masking is a procedure of forming CUR* based on CUR. We again fix some n and omit here the corresponding upper indices $n_j$, $j=1, \ldots, c$. We form $CUR_i^*$ using polynomials $CUR_i$ as we did it forming $CUR_i$ using polynomials $M_i$. So for a fixed n and $i=1, \ldots, 2^n+1$ we have $$CUR_1^* = CUR_1 \oplus \delta \oplus \beta,$$

$$CUR_2^* = CUR_2 \oplus \delta^{int(CUR_1)} \oplus \beta^{int(CUR_1^*)}$$

$$CUR_3^* = CUR_3 \oplus \delta^{(int(CUR_2)+int(CUR_1))mod2^n} \oplus \beta^{(int(CUR_2^*)+int(CUR_1^*))mod2^n}$$

$$\ldots$$

$$CUR_i^* = CUR_i \oplus \delta^{(int(CUR_{i-1})+int(CUR_{i-2}))mod2^n} \oplus \beta^{(int(CUR_{i-1}^*)+int(CUR_{i-2}^*))mod2^n}$$

and $$CUR_i^* = CUR_i \oplus \delta^{(int(CUR_{i-1})+int(CUR_{d_1}))mod2^n} \oplus \beta^{(int(CUR_{i-1}^*)+int(CUR_{d_2}^*))mod2^n}$$

for $i=2^n+2, \ldots, k$, where $$d_i = i-2-\text{int}(CUR_{i-1}), \; d_2 = i-2-\text{int}(CUR_{i-1}^*).$$

We will call the construction of forming CUR* the iterated masking of the first degree, while the construction of generating CUR is the iterated masking of zero degree. By analogy we consider CUR, CUR*, … —the iterated masking of the second, the third degree and so forth.

Partitioning

So, we prepared c sets of the sequences of polynomials (7) for $i=1, \ldots, k$ of the corresponding degrees. Now we choose some $r_j \geq 200$. The value of $r_j$ will define the number of classes, on which we will split each sequence. On the other hand, $r_j$ will also define the number of elements of a knapsack that we are going to form. In order to construct the knapsack of a cryptographic significance (for constructing MAC) we choose $r_j$ not less than 200. We wish to distribute the elements of all the sequences (7) between the partitions. It can be done in many ways.

One of the simplest ways of such a distribution is to assign the first $k/r_j$ elements to the first partition, then next $k/r_j$ elements to the second partition and so forth. The last partition in that case will contain k mod $r_j$ polynomials.

Let us present another possibility of the partitioning. The specific feature of the partitioning is that we do not define the number of partitions from the beginning. We form partition by partition and process them one by one after the preparation.

For hardware implementation of the presented hash and MAC system, an efficient way of distributing the elements of sequences (7) between partitions can be defined as follows. We choose some number z greater than or equal to 1 and assign the first z elements of the sequences to the first partition, the next z elements to the second partition and so forth. When the last $r_j$-th partition is considered we return to the very first partition and the next z elements we assign to it, then we again use the second partition and so forth. In the case of MAC number z can be defined by a key.

Note that the methods of partitioning the polynomials presented above have one specific feature, namely, a few (neighbouring) polynomials can be assigned to one and the same partition, say, in a framework of one iteration.

Now we present a few methods of the partitioning, usage of which will guarantee that any two neighbouring elements cannot be sent to one and the same partition, during one iteration. We will refer the methods to as the separated partitions.

The next few possibilities of partitioning are based on the calculation of special indices. We calculate c sets of indices in accordance with $$ind_1^{n_j}(1) = 1 + \text{int}(CUR_1^{n_j}) \bmod r_j, \qquad (8)$$

$$ind_1^{n_j}(2) = 1 + (ind_1^{n_j}(1) + \text{int}(CUR_1^{n_j})) \bmod r_j$$

$$\ldots$$

$$ind_1^{n_j}(i) = 1 + (ind_1^{n_j}(i-1) + \text{int}(CUR_i^{n_j})) \bmod r_j$$

for $j=1, \ldots, c$, $i=3, \ldots, k$. We need to assign to each value $CUR_i^{n_j}$ one of $r_j$ partitions, where $j=1, \ldots, c$, $i=1, \ldots, k$. We calculate value $ind_1^{n_j}(i)$ in accordance with (8) for $CUR_i^{n_j}$ and the value will define the index (number) of the partition, to which $CUR_i^{n_j}$ will be assigned.

Consider a few more variants of constructing the index of the partitioning $$ind_2^{n_j}(1) = 1 + \text{int}(CUR_1^{n_j} \oplus M_1) \bmod r_j, \qquad (9)$$

$$ind_2^{n_j}(2) = 1 + (ind_2^{n_j}(1) + \text{int}(CUR_2^{n_j} \oplus M_2)) \bmod r_j,$$

$$\ldots$$

$$ind_2^{n_j}(i) = 1 + (ind_2^{n_j}(i-1) + \text{int}(CUR_2^{n_j} \oplus M_2)) \bmod r_j$$

or $$ind_3^{n_j}(1) = 1 + (\text{int}(CUR_1^{n_j}) + \text{int}(M_1)) \bmod r_j, \qquad (10)$$

$$ind_3^{n_j}(2) = 1 + (ind_3^{n_j}(1) + \text{int}(CUR_1^{n_j}) + \text{int}(M_1)) \bmod r_j,$$

$$\ldots$$

$$ind_3^{n_j}(i) = 1 + (ind_3^{n_j}(i-1) + \text{int}(CUR_i^{n_j}) + \text{int}(M_i)) \bmod r_j,$$

and

-continued $$ind_4^{n_j}(1) = 1 + \text{int}(CUR_1^{n_j}) \bmod r_j,$$ (11)
$$ind_4^{n_j}(2) = 1 + (ind_4^{n_j}(1) + \text{int}(CUR_2^{n_j})) \bmod r_j,$$
$$\ldots$$
$$ind_4^{n_j}(i) = 1 + (ind_4^{n_j}(i-1) + \text{int}(CUR_i^{n_j})) \bmod r_j$$

for $i=1, \ldots, k$. In general, any function of calculating the indices that involves in one way or another the elements of the corresponding $S(M,n_j)$ or $CUR^{n_j}$ can be used for defining the indices. When we consider MAC, such a function can be dependent on a key.

Now we present one more important way of constructing a separated partition, which we will refer to as the conditional distribution.

Consider the following table.

|     | 1 | 2 | 3 | 4 | 5 | 6 | 7 |
|-----|---|---|---|---|---|---|---|
| $n_j$ | 4 | 5 | 6 | 7 | 8 | 9 | 10 |
| $s_j$ | 4 | 5 | 8 | 11 | 16 | 22 | 32 |

To every $j=1, \ldots, c$ we associate $s_j$ ordered sets $\Phi_i^j$ of pairs $(x,y)$, where $x$ and $y$ are such integers that $x=1, \ldots, i$, $y=1, \ldots, i$ and $|\Phi_i^j| \leq 2^i$, $i=1, \ldots, s_j$. In other words, $$\Phi_i^j = \{(x,y) | x=1, \ldots, i, y=1, \ldots, i\},$$

where $i=1, \ldots, s_j$. For instance, if $n_j=4$ ($j=1$) we get the following ordered sets of pairs $\Phi_i^1$ $$\Phi_1^1 = \{(1,1)\}, \Phi_2^1 = \{(1,1), (1,2), (2,1), (2,2)\},$$

and so forth. The elements (pairs) of $\Phi_i^j$ can be considered as indices of the corresponding entries (row by row from left to right) of the corresponding square matrices. It is clear that $\Phi_4^1$ contains exactly $2^4$ elements.

Remark, that $|\Phi_j^{s_j}| = 2^{s_j}$ for $j=1, 3, 5, 7$ and $|\Phi_j^{s_j}| < 2^{s_j}$ for $j=2, 4, 6$.

Further, to every $j=1, \ldots, c$ we associate an integer $f_j$, where $0 < f_j \leq s_j$.

Then, for any $j=1, \ldots, c$, if $M[1]$ is 1, we assign $CU R_1^{n_j}$ to partition $1+x \bmod r_j$, otherwise, to partition $1+(x+y) \bmod r_j$, where $(x,y)$ is the $(\text{int}(CUR_1^{n_j}) \bmod f_j) - s$ element (a pair) of set $\Phi_{f_j}^j$. Denote the index of the activated partition by $h_1$. If, then, $M[2]$ is 1, we assign $CU R_2^{n_j}$ to the partition $1+(h_1+x) \bmod r_j$, otherwise, polynomial $CU R_2^{n_j}$ will be sent to partition $1+(h_1+x+y) \bmod r_j$, where now $(x,y)$ is the $(\text{int}(CUR_2^{n_j}) \bmod f_j) - s$ element of set $\Phi_{f_j}^j$, and so forth. So, if on the i-th step of the calculation the index of the current partition is $h_i$, then if $M[i+1]$ is 1, we assign polynomial $CU R_{i+1}^{n_j}$ to partition $1+(h_i+x) \bmod r_j$, otherwise, polynomial $CU R_{i+1}^{n_j}$ will be sent to partition $1+(h_i+x+y) \bmod r_j$, where $(x,y)$ is the $(\text{int}(CUR_i^{n_j}) \bmod f_j) - s$ element of set $\Phi_{f_j}^j$.

Note that if we numerate the partitions starting from 0, that is, if we associate to any $n_j$ partitions $0, 1, \ldots, r_j$, $j=1, \ldots, c$ the formulas defining the index of partition for the conditional distribution on the i–s step will be $$(h_i+x) \bmod (r_j+1) \text{ or } (h_i+x+y) \bmod (r_j+1)$$

depending on the value of $M_i$.

In that case the formulas (8), (9), (10) and (11) will be slightly modified too.

Forming the Bit Strings

In a framework of the current subsection we will refer to tables, instead of partitions. We will show now how to construct special row matrices, which will be named the bit strings. Note that the bit strings are constructed so as not to allow sending any two neighbouring polynomials from any sequence $CUR^{n_j}$ to one and the same table. In other words, the bit strings are constructed just in the case of usage the separated partitions.

Denote by $Tb_i^{n_j}$ the i-th table, related to sequence $CUR^{n_j}$ and by $Tb_i^{n_j}(s)$ let us denote the s-th, element (entry) of a table $Tb_i^{n_j}$, where $s=1, \ldots, 2^{n_j}-1, j=1, \ldots, c$. So, a table $Tb_i^{n_j}$ (or a partition) is a row matrix containing $2^{n_j}$ elements.

To each table $Tb_i^{n_j}$ we associate, then, in general not more than $2^{n_j}$ bit strings of length $sz_i^{n_j}$ that is, the length of the bit strings for different tables of a sequence $CUR^{n_j}$ can be different. To any element $s$ of a table $Tb_i^{n_j}$ we associate a bit string $e_{is+1}^{n_j}, j=1, \ldots, c, i=1, \ldots, r^{n_j}, s=0, \ldots, 2^{n_j}-1$. We reserve one more special bit string $e_{i0}^{n_j}$ that is not related to any particular element $s$ of a table $Tb_i^{n_j}$. Denote, at last, by $e_{is}^{n_j}(t), t=0, \ldots, sz_i^{n_j}$ the t-th bit of bit string $e_{is}^{n_j}$. The bit strings are changed during the partitioning. Before the partitioning all the bits of all bit strings are set to 0.

Denote by $\Theta_i^{n_j}$ a collection of the indices of the corresponding bit strings that we prepare for a table $Tb_i^{n_j}$. So, $s \in \Theta_i^{n_j}$ means that a bit string $e^{n_j}$ is prepared and the bit string is associated to element s−1 of a table $Tb_i^{n_j}$. (Note that there is considerable flexibility in the choice of the $\Theta_i^{n_j}$). If $\Theta_i^{n_j}$ contains all the indices $s=1, \ldots, 2^{n_j}$ we do not need a special bit string $e_{i0}^{n_j}$, and therefore, in that case $0 \in \Theta_i^{n_j}$. Otherwise any $\Theta_i^{n_j}$ contains 0, that is, a special bit string is always prepared.

Without loss a generality, we describe the procedure of updating the bit strings for the case of the conditional distribution.

Assume that table $Tb_i^{n_j}$ is activated on the w-th step of the calculation, that is, $$i = 1+(x+h_{i-1}) \bmod r_j) \text{ or } i = 1+(x+y+h_{i-1}) \bmod r_j)$$

depending on the value of $M_i$ for the corresponding $x$ and $y$.

Assume further that $f_j(w) \leq sz_i^{n_j}$ and consider a polynomial $CUR_w^{n_j}$. If $s \in \Theta_i^{n_j}$, where $$s = \text{int}(CUR_w^{n_j})+1$$

we set $$e_{is}^{n_j}(f_j(w)) = 1,$$

otherwise $$e_{i0}^{n_j}(f_j(w)) = 1.$$

Let $f_j(w) > sz_i^{n_j}$. Again, if $s \in \Theta_i^{n_j}$, where $s = \text{int}(CUR_w^{n_j})+1$ we set $$e_{is}^{n_j}(t') = B \oplus 1,$$

otherwise $$e_{i0}^{n_j}(t') = B \oplus 1.$$

Here $t' = f_j(w) \bmod sz_i^{n_j}+1$ and $B$ is one of the values $\{0,1\}$ of the t'-th bit of the corresponding bit string before the updating.

So at the end we obtain the bit strings $e_{ik}^{n_j}, i=1, \ldots, r_j$, $k \in \Theta_i^{n_j}$. Recall that any $\Theta_i^{n_j}$ contains at least one element 0.

Based on the bit strings we compute integers BS as follows $$BS^{n_j}(i) = \sum_{x \in \Theta_i^{n_j}} (x+1) \text{int}(e_{ix}^{n_j}).$$

We will use integers $BS^{n_j}(i)$, $i=1, \ldots, r_j$ when we calculate the knapsack.

The bit strings play a role of a "time" dimension for the elements of the tables. Indeed, when we activate the tables we just increment their values and we do not have any idea about when the activation took place. Using the bit strings, we fix the "time" of the activation. By "time" we mean value $f_j(i)$, $i=1, \ldots, k$ defined above. In other words, we are interested in knowing during which iteration of the distribution of the elements of $CUR^{n_j}$ between the tables, that or another table was activated, firstly, and exactly which entry of the table was incremented (of course, if the corresponding bit string was prepared for considered entry).

Changing the number of bit strings sufficiently increases the number of states of the FSM (finite state machine) that is related to the considered hash function. In other words, the collision resistance of the function depends on the number of bit strings ant their length.

In general, there is no need to generate all bit strings $e_{is}^{n_j}$, for all $s=1, \ldots, 2^{n_j}$, as it can reduce the speed of the program and will require extra memory.

Factoring

For every sequence of polynomials CU $R^{n_j}$ (that have already been distributed between the corresponding partitions), prepare new registers $R_{ik}^{n_j}$ $i=1, \ldots, r$, $k=1, \ldots, \text{irr}(n_j)$, $j=1, \ldots, c$, where, again, $\text{irr}(n_j)$ is the number of irreducible polynomials of degree less than $n_1$. So for the sequence of polynomials CU $R^{n_j}$ we define $r_j$ partitions (tables) and any partition is associated with $\text{irr}(n_j)$ registers. Before the factorization procedure we set the initial values of all the registers equal to zero. The values of the registers will be determined by means of factoring the polynomials of sequences (6) in the following way.

On the i-th step, having calculated the value CU $R^{n_j}$, (which has been assigned to, say, partition x), we increase the values of the registers $R_{ik}^{n_j}$ by $FC_{n_j}(CUR_i^{n_j}, k)$ for $k=1, \ldots, \text{irr}(n_j)$. The values of the registers $R_{ik}^{n_j}$ of all the sequences (6) are the desired features of initial sequence of bits (file) M. We will call values $R_{ik}^{n_j}$ the spectrums.

We describe one more algorithm of the factoring. We will call it the conditional factoring.

Assume that each of the partitions "is responsible" for certain section of a file. We can do it by means of certain formula, say, elements $M_1, M_{200}, \ldots$ and so on form "the area of responsibility" of the first partition (assume that considered $r_j$ is equal to 200), then $M_2, M_{201}, \ldots$ belong to the "area of responsibility" of the second partition and so forth. Such a formula can be not that straightforward, that is, any easily calculated rule of the conditional distribution can be considered. When we calculate CU $R_i^n$ we also calculate the index of partition to which it has to be assigned. Assume that partition q is chosen. In this case, if $M_i$ from the considered CU $R^{n_i}$ belongs to the "area of responsibility" of the current partition, that is, partition q, we multiply the corresponding factors, say, by 2 (in general, by any fixed number) before adding it to the corresponding spectrum, otherwise we do not change it.

Enumerating the Spectrums

I. Cantor Enumeration

Cantor enumeration can be presented as a recursive function (A. I.Mal'cev, Algorithms and recursive functions, Wolters-Noordhoff Pub. Co. 1970)

$c_d: N^d \to N$, which enumerates any finite ordered sequences of integers. If $d=2$ then for any pair of integers $<x,y>$ we have $$c_2(x,y) = \frac{(x+y)^2 + 3x + y}{2}.$$

Let $n=c(x,y)$ for an arbitrary pair $<x,y>$. Then there exist two functions $l(n)$ and $r(n)$ such that $x=l(n)$ and $y=r(n)$, where $$l(n) = n - 0.5 \left[ \frac{\left[\sqrt{8n+1}\right]+1}{2} \right] \left[ \frac{\left[\sqrt{8n+1}\right]-1}{2} \right]$$

and $$r(n) = \left[ \frac{\left[\sqrt{8n+1}\right]+1}{2} \right] - l(n) - 1.$$

The functions $c(x,y)$, $l(n)$ and $r(n)$ are related by the following correspondences $c(l(n), r(n))=n$, $l(c(x,y))=x$, $r(c(x,y))=y$.

One can easily enumerate triples, quadruples of numbers and so on. Indeed, $c_3(x_1, x_2, x_3) = c_2(c_2(x_1, x_2), x_3)$, More generally, define $c_{n+1}(x_1, x_2, \ldots, x_{n+1}) = c_n(c_2(x_1, x_2), x_3, \ldots, x_{n+1})$.

Number $c_n(x_1, x_2, \ldots, x_n)$ is called the Cantor number of the n-tuple $<x_1, x_2, \ldots, x_n>$.

Note that if $c_n(x_1, x_2, \ldots, x_n) = x$, then $x_n = r(x), x_{n-1} = rl(x), \ldots, x_2 = rl \ldots l(x), x_1 = ll \ldots l(x)$.

II. Calculations of Cantor Numbers of the Spectrums

Consider any sequence CU $R^n$, for which we have already calculated spectrums $R_{ij}$ $i=1, \ldots, r_l$, $j=1, \ldots, \text{irr}(n_l)$, $l=1, \ldots, c$ (we omitted upper indices of the registers $R_{ij}$ here). Define now the enumerating procedure of spectrums (registers) $R_{ij}$, $1 \leq i \leq r$, $1 \leq j \leq \text{irr}(n_l)$. If we compute numbers $E_i$ for $1 \leq i \leq r$ by means of direct enumerating, that is, $E_i = c_{\text{irr}(n_l)}(R_{i1}, R_{i2}, \ldots, R_{i\text{irr}(n_l)})$, where $c_{\text{irr}(n_l)}$ is the above-described Cantor enumeration function, we can obtain really huge numbers. For instance, if we enumerate the following spectrum for $n=6$ directly, that is, by $E_i = c_{16}(5, 3, 161, 139, 37, 21, 13, 9, 6, 3, 2, 2, 3, 1, 4, 2)$ we obtain the number in 32892 digits, which is unacceptable. Therefore we describe the following enumerating procedure.

Consider any spectrum $\text{Spec}_j = \{s_1, s_2, \ldots, s_j\}$, where $j=7, 10, 16, 25, 43, 71, 129$, which, in turn, corresponds to $n_j=4, 5, \ldots, 10$.

CASE 1. $j=7$. We set $$E_7 = c(c(c(c(s_1, s_2), s_3), c(s_4, s_5)), c(s_6, s_7)).$$

CASE 2. $j=10$. We set $$E_{10} = c(c(c(c(s_1, s_2), s_3), c(s_4, s_5)), c(c(s_6, s_7), c(c(s_8, s_9), s_{10}))).$$

CASE 3. $j=16$. We set $$E'_{16} = c(c(c(s_1, s_2), c(s_3, s_4)), c(c(s_5, s_6), c(s_7, s_8))),$$

$$E'_{16} = c(c(c(s_9, s_{10}), c(s_{11}, s_{12})), c(c(s_{13}, s_{14}), c(s_{15}, s_{16}))),$$

and finally $$E_{16} = c(E'_{16}, E''_{16}).$$

CASE 4. $j=25, 43$. We divide 25 and 43 elements of the spectrums into 7 and 10 groups, correspondingly, in the following way. We take the first nine elements of $\text{Spec}_{25}$ and compute integers $$c(s_1, c(s_2, s_3)), c(s_4, c(s_5, s_6)), c(s_7, c(s_8, s_9)).$$

Then we divide 16 remaining elements of $\text{Spec}_{25}$ into four groups by four elements in each group and calculate four integers by $$c(c(s_{10}, s_{11}), c(s_{12}, s_{13})), c(c(s_{14}, s_{15}), c(s_{16}, s_{17})),$$

$$c(c(s_{18}, s_{19}), c(s_{20}, s_{21})), c(c(s_{22}, s_{23}), c(s_{24}, s_{25})).$$

We eventually get seven integers, which will be enumerated as it was described in CASE 1. Considering $\text{Spec}_{43}$ we act in the same manner, just divide the elements of the spectrum into 7 groups by 4 elements each and 15 last elements by 5 elements each. Below we show how to enumerate the group of five elements a, b, c, d, e. We set $$c(c(a, c(b, c)), c(d, e)).$$

We obtain ten integers and apply the procedure, described in CASE 2 above.

CASE 5. $j=71, 129$. Consider $\text{Spec}_{71}$. We divide the elements of the spectrum into 16 groups. First nine groups contain 4 elements each and 7 remaining groups contain 5 elements each. We have already shown how to enumerate a group of four or five elements. We get 16 integers and apply the method of CASE 3.

All the elements of $\text{Spec}_{129}$ are divided into 25 groups. The first 25 groups contain 5 elements each and the last group contains 9 elements, which we enumerate in accordance with $$c(c(c(a, c(b, d)), c(e, c(f, h))), c(g, c(i, j))).$$

We get 24 integers, which we enumerate in accordance with the method of CASE 4.

In general, one can use one and the same formula of enumerating the spectrums for different $n_j$, $j=1, \ldots c$.

As we calculate the enumeration procedure for every partition $i=1, \ldots, r_l$ and for every sequence CU $R^{n_l}$, $l=1, \ldots, c$ we obtain $r_l$ c integers $E_{ij}$.

Organizing a Knapsack

As a result of enumeration we obtain integers $E_{ij}$, $i=1, \ldots, r_j$, $j=1, \ldots, c$. These integers are associated with the corresponding tables that we obtain after the factorization. The corresponding integers $BS^{n_j}(i)$, that are calculated based on the bit strings also are related to the tables and therefore we want to show how $E_{ij}$ and $BS^{n_j}(i)$ should be combined. We compute c knapsacks (sums) for $j=1, \ldots, c$ $$V_j = E_{1j} + BS^{n_j}(1) + 2(E_{2j} BS^{n_j}(2)) + \ldots + r_j(E_{r_j j} + BS^{n_j}(r_j)).$$

In the Damgard-Merkle construction, each block of fixed size is hashed and the calculated intermediate hash value is combined with the next block. In the construction described above, we have a different situation. Each block and associated bit string yields a factor table. Moreover, the bit string is xor-ed to the bit string of the next block, and the factor table construction is iterated. Finally, we obtain a bit string and a cumulative factor table.

Exponentiation

Let, further, G be a cyclic group, for which the discrete logarithm problem is hard, and assume that g is a generator of G. Let $\tau$ be the size (in bits) of presentation of any element from G. We define a general scheme of computing points $H_i$ of group G, based on $V_i$, $i=1, \ldots, c$. We set $$H_i = g^{V_i}$$

We show two examples of the calculation of $H_i$, based on the above-described general scheme.

EXAMPLE 1

Let $\tau$ be a length of a hash-value. Choose a primitive element $$\gamma \in GF(2^\tau)$$

Then values $H_i$ of G are defined by $$H_i = \gamma^{V_i} \qquad (14)$$

EXAMPLE 2

Choose a $GF(2^\tau)$ and let E be an elliptic curve over $GF(2^\tau)$ with good cryptographic properties (N. Koblitz, Elliptic Curve cryptosystems, Math. Comp., 48(1987), 203-209). Let $\gamma$ be a generator of $E(GF(2^\tau))$. Then the points $H_i$ of $E(GF(2^\tau))$ are calculated by $$H_i = V_i \gamma \qquad (15)$$

The Final Hash Value Calculation

Thus, we have c elements $H_i = g^{V_i}$ of the corresponding group G. We generate the final hash value H of string of bits M in accordance with $$H = n_1 H_1 \times n_2 H_2 \times \ldots \times n_c H_c,$$

where $\times$ is the group operation. For instance, in the case of group $E(GF(2^\tau))$ for some elliptic curve E over $GF(2^\tau)$ we get $$H = n_1 H_1 + n_2 H_2 + \ldots + n_c H_c.$$

In that case, the x-coordinate of H is the final hash value of initial message (sequence of bits) M.

Message Authentication Coding

A secure hash function, or MAC is a map $$H: \{0,1\}^* \times K \to \{0,1\}^\tau,$$

where K is a key space. A key can be involved in the process of constructing a fingerprint in some of the considered stages of generation of a hash value. The analysis of all the cases will be done below.

We want to present some of the possibilities of the transforming the ash function into a MAC function. So, let K be a key. Using K as an input for an appropriate pseudo-random generator we generate a sequence S of size k, where k is the length (in bits) of initial sequence M. Denote by $S_i$ the i-th bit of sequence S.

There is another possibility to form a sequence of bits $S_i$ based an a key K. Indeed, if l is the length of a key K, for any i=1, ... k we consider value $S_i$=K[j] where j=1+i mod l. Recall that K[j] is the j–s bit of K.

Below we describe various possibilities of transforming the hash function into MAC.

Key Scheme on the Stage of Splitting

A. At the stage of splitting for some fixed j we form the sequence of polynomials $S(M, n_j)$ in the following way. For any i we consider the value $S_i$. If $S_i$ is equal to 1, we include element $M_i$ into $S(M, n_j)$, otherwise, element $M_i$ is not included in $S(M, n_j)$.
B. We apply the same procedure of including elements $M_i$ into $S(M, n_j)$, depending on the value of $S_i$ for all j=1, ... , c.
C. For some fixed j for any i if $S_i$ is equal to 1, we include element Mi into $S(M, n_j)$, otherwise, instead of $M_i$, we include its negation, that is, element $\overline{M_i}$.
D. The procedure described in C is applied to all j=1, ... , c.

We do not change any of the remaining stages of the generation of a fingerprint of M.

Key Scheme on the Stage of Masking

A. For some fixed j and for any i=1, ... , k if $S_i$, for instance, is 1, we calculate $$CUR_i^{n_j} = M_i \oplus \delta^{(int(M_{i-1})+ind(M_{d1})) mod\, 2^{n_j}} \oplus \beta^{(int(CUR_{i-1}^{n_j})+int(CUR_{d2})) mod\, 2^{n_j}}.$$

If $S_i$ is 0, then $$\overline{CU\ R_i^{n_j}} = M_i \oplus \delta^{(int(M_{i-1})+ind(M_{d_1})) mod\, 2^{n_j}} \oplus \beta^{(int(CUR_{i-1}^{n_j})+int(CUR_{d_2})) mod\, 2^{n_j}}.$$

B. We apply the procedure, described in A to all j=1, ... , c.
C. The j, for which we apply scheme A, is defined by a key K, that is, it is a part of a key K.

We do not change any of the remaining stages of the generation of a fingerprint of M.

Key Scheme on the Stage of Partitioning

We describe the scheme of involving a key on the stage of partitioning $CU\ R_i^{n_j}$.

A. Based on a key K, generate randomly k integers $x_i$ and form the following sequence of integers $y_i$ $$y_i = \sum_{i=1}^{k} x_i \bmod r.$$

For some fixed j, $CU\ R_i^{n_j}$ is assigned to partition $y_i$+1.
B. The procedures described in A is applied to all j=1, ... , c.
C. In schemes A and B, the fixed j is defined by a part of a key K.

We do not change any of the remaining stages of the generation of a fingerprint of M.

Key Scheme on the Stage of Forming the Bit Strings

A. A key K defines the sequence of the elements for the corresponding tables for which we will prepare the bit strings for a certain j. For instance, based on a key K, we again generate integers $y_{ij}$, i=1, ... , $f_j$, $f_j$<$r_j$ and for the tables $y_{ij}$ we prepare the bit strings for the first $y_{ij}$ mod $2^{n_j}$ elements that activate the corresponding tables.

B. The same as A but for all j.

We do not change any of the remaining stages of the generation of a fingerprint of M.

Enhancing the Security

The proposed hash function has at least four optional parameters changing of which leads to enhancing the security of the function.

First of all it is necessary to use at least c=2 and to form one forward and one backward splitting. In general, the grater the value of c, the more secure the hash function, that is, it is more difficult to create a collision. However, increasing the value of c we also reduce the speed of the algorithm. In any case at least one splitting has to be always backward splitting.

Secondly, the security of the hash (and MAC) function can be sharply increased by means of increasing the number and the sizes of the bit strings. It is important to remark that such an increasing does not lead to a rapid reducing the speed of the algorithm.

Thirdly, choosing the iterated masking of higher degree increasing the security of the hash function, as in that case the analysis of the relation between $M_i$ and, say, $CUR^{**}_i$ becoming practically non-realisable. And again, it leads to reducing the speed of the algorithm.

At last, considering the conditional distribution of $CUR_i$ (or $CUR^{**}_i$) between the partitions and choosing $f_i$ equal to $s_i$ (or at least, close to si) increases the security of the algorithm and does not reduce the speed rapidly.

Iterated masking; see the flow charts "Hashing with iterations" and "Message authentication coding with iterations" also increases the resistance to creating a collision, as in that case, the collection of the systems system of the corresponding non-linear iterated equations will be much more difficult.

Implementation

As one example, the method of the present invention can be readily implemented in a Dynamically Linked Library or DLL which is linked to a computer program that utilizes an algorithm that embodies the hash function or MAC function described above, for example, an encryption, decryption or authentication utility that is operable to apply said algorithm.

The computer program of the present invention is therefore best understood as a computer program that includes computer instructions operable to implement an operation consisting of the calculation of the hash value or MAC value as described above.

Another aspect of the present invention is a computer system that is linked to a computer program that is operable to implement on the computer system the transformation of a MAC-value, in accordance with the present invention.

This invention will be of use in any environment where hash functions and MAC functions are used for data integrity or authentication (digital signatures being an example).

An example is secure email. Several widely used systems for secure email (such as PGP and S/MIME) use SHA-1 as the hash algorithm.

Another application is to secure Virtual Private Networks (VPNs) by operation of the present invention. Such networks allow clients to use standard internet connections to access closed private networks. The authentication of such networks is based on a protocol such as IPSec or SSL. In both cases, the authentication uses a MAC algorithm such as SHA-1. Thus, vulnerability in SHA-1 will result in vulnerability of the VPN. By introducing a MAC algorithm based on the above, these vulnerabilities are mitigated.

One more application is to secure Digital Signatures by operation of the present invention. One of the algorithmic stages of any Digital Signatures is hashing. In fact, a Digital Signatures algorithm is usually applied to a hash (or MAC) value of a file. And almost all Digital Signatures algorithms now using SHA-1 as such a hash (or MAC) algorithm. And, again, vulnerability in SHA-1 will result in vulnerability of all the Digital Signatures algorithms.

As another example, the method of the present invention can be readily implemented in a specially constructed hardware device. As discussed above, the bit stream specific is one of the most important features of the present invention. It means that the hardware implementation of the present invention is very convenient and easily realisable. Moreover, such a hardware implementation of the present invention enables a dramatic increase in the speed of hashing, as all the hardware implementations of stream algorithms are usually much faster than the corresponding software implementations. We stress here that all the algorithms of the SHA family (as well as the MD and RIPEMD families) are block-based algorithms and are not convenient for hardware implementations.

An integrated circuit can be created to perform the calculations necessary to create a hash value or MAC value. Other computer hardware can perform the same function. Alternatively, computer software can be created to program existing computer hardware to create hash or MAC values.

The invention claimed is:

1. A computer implemented method for performing a secure hashing method, the computer implemented method comprising the steps of:
   (1) representing, or facilitating the representing, by one or more computer processors, an initial sequence of bits as a set of polynomials constructed to a fixed-degree;
   (2) transforming, or facilitating the transforming, by one or more computer processors, the set of polynomials by masking;
   (3) partitioning, or facilitating the partitioning, by one or more computer processors, the transformed set of polynomials into a plurality of classes;
   (4) forming, or facilitating the forming, by one or more computer processors, a bit string during the partitioning, said partitioning involving separated partitions;
   (5) for each of the plurality of classes, factoring, or facilitating the factoring, by one or more computer processors, each polynomial of the set of polynomials transformed into the plurality of classes and so as to define a set of irreducible polynomials and collecting one or more factors in registers, said registers being defined for each of the plurality of classes;
   (6) wrapping, or facilitating the wrapping, by one or more computer processors, one or more values of the registers from the plurality of classes by means of an enumeration;
   (7) organizing, or facilitating the organizing, by one or more computer processors, the enumeration and the bit strings into a knapsack; and
   (8) performing an exponentiation, or facilitating the performing of an exponentiation, by one or more computer processors, in a group to obtain a hash value.

2. A non-transitory computer readable medium storing instructions and data to create a hash value, the computer readable medium comprising:
   (1) said instructions and data for configuring one or more computer processors to:
   (a) represent, or facilitate the representation of, an initial sequence of bits as a set of polynomials constructed to a fixed-degree;
   (b) transform, or facilitate the transformation of, the set of polynomials by masking;
   (c) partition, or facilitate the partition of, partitioning the transformed set of polynomials into a plurality of classes;
   (d) form, or facilitate the formation of, forming the a bit string during the partitioning, said partitioning involving separated partitions;
   (e) for each of the plurality of classes, factor, of facilitate the factoring of, each polynomial of the set of polynomials transformed into the plurality of classes and so as to define a set of irreducible polynomials and collect one or more factors in registers, said registers being defined for each of the plurality of classes;
   (f) wrap, or facilitate the wrapping of, one or more values of the registers from the plurality of classes by means of an enumeration;
   (g) organize, or facilitate the organization of, the enumeration and the bit strings into a knapsack; and
   (h) perform, or facilitate the performance of, an exponentiation in a group to obtain a hash value.

* * * * *